UNITED STATES PATENT OFFICE.

L. REID, OF BARREN ISLAND, NEW YORK.

IMPROVEMENT IN PROCESSES FOR PREPARING FERTILIZERS.

Specification forming part of Letters Patent No. 16,882, dated March 24, 1857.

*To all whom it may concern:*

Be it known that I, LAWRENCE REID, of Barren Island, Long Island, State of New York, have invented a new Preparation and Composition of Matter for use as a Fertilizer; and I do hereby declare that the following is a full and exact description of the mode of making such preparation.

The nature of my invention consists in making a combination of animal and earthy matters with saline ingredients in such proportion and prepared in such manner as will form a compound of salts of ammonia, superphosphate of lime, sulphate, dried clay, and animal matters, (all established fertilizers,) producing this result by the treatment of animal or fish offal with sulphuric acid, water, bones, and clay, as hereinafter described.

To enable others skilled in chemical arts to make this preparation, I proceed to describe my method of operating.

I reduce animal matters—as carcasses, offal, or fish—to a pulp by boiling or steaming. I prefer high-pressure steam—about forty pounds to the square inch. I separate the fat, if present, as is usually done. I also separate the fluid from the pulpy part, treating the fluid part with sulphuric acid in the proportion of one-quarter pound acid for every gallon of the strength of ten degrees, as indicated by Baumé's hydrometer, for about four hours at a temperature of about 180° Fahrenheit's thermometer, producing this temperature by steam, passing it through leaden pipes in a wooden vat. A leaden vat would do for the same purpose, not being corroded by the sulphuric acid. By this means I obtain a partial formation of sulphate of ammonia. To this acid fluid I add bone-dust in sufficient quantity to neutralize it, preferring bone-dust prepared from bones which have been subjected to high-pressure steam, as being better adapted for this purpose, from the finer state of division they can be easily reduced to. The solid or pulpy part, by picking out the same with the hand or any other proper mechanical means, being deprived of bones and cartilaginous matters that would interfere with its being properly ground, is mixed in the proportion of about one ton to a like weight of the fluid part that has been treated with acid and bone-dust, as before mentioned. To all is then added one-eighth of a ton of finely-pounded bones and a similar quantity of pulverized dried clay. All are mixed and placed on heated iron plates to dry, or otherwise dried and ground for use.

In obtaining a pulverulent mass, as above, it may be necessary to vary the proportions with the nature of the organic matters operated upon, and I do not limit myself to the use of clay and bone-dust as absorbents, but claim the use of other materials known as "absorbents" in combination with animal matters treated with sulphuric acid, in the manner described.

In the patent of Robert Hare the whole animal is treated, which requires so much acid as to render it too expensive for practice. I confine my action of acid to the liquid portion obtained by boiling or steaming with water.

I do not claim treating the soft parts of animals by concentrated mineral acids and then adding bone-dust as absorbents for a manure, that having been already done in the patent of Dr. Hare; but

What I claim as my improvement consists in—

Treating with acid only the liquid parts of the animal matter after the same have been boiled or treated by high-pressure steam, and then treating the same with bone-dust and absorbents, in the manner set forth.

LAWRENCE REID.

Witnesses:
C. J. PATTON,
J. A. HUGHES.